(12) United States Patent
Kunkel et al.

(10) Patent No.: US 11,344,990 B2
(45) Date of Patent: May 31, 2022

(54) ARTICLES FOR LAPPING STACKED ROW BARS HAVING IN-WAFER ELG CIRCUITS

(71) Applicant: Seagate Technology LLC, Cupertino, CA (US)

(72) Inventors: Gary J. Kunkel, Minneapolis, MN (US); Zoran Jandric, St. Louis Park, MN (US)

(73) Assignee: Seagate Technology LLC, Fremont, CA (US)

( * ) Notice: Subject to any disclaimer, the term of this patent is extended or adjusted under 35 U.S.C. 154(b) by 262 days.

(21) Appl. No.: 16/728,251

(22) Filed: Dec. 27, 2019

(65) Prior Publication Data

US 2020/0147748 A1 May 14, 2020

Related U.S. Application Data (62) Division of application No. 15/635,414, filed on Jun. 28, 2017, now Pat. No. 10,518,381.

(51) Int. Cl.
| | |
|---|---|
| *G11B 5/31* | (2006.01) |
| *B24B 37/013* | (2012.01) |
| *B24B 37/04* | (2012.01) |
| *G11B 5/60* | (2006.01) |

(52) U.S. Cl.
CPC .......... *B24B 37/013* (2013.01); *B24B 37/048* (2013.01); *G11B 5/3166* (2013.01); *G11B 5/3169* (2013.01); *G11B 5/6082* (2013.01)

(58) Field of Classification Search
None
See application file for complete search history.

(56) References Cited

U.S. PATENT DOCUMENTS

| | | | |
|---|---|---|---|
| 5,406,694 A | 4/1995 | Ruiz | |
| 5,494,473 A | 2/1996 | Dupuis et al. | |
| 5,738,566 A | 4/1998 | Li et al. | |
| 6,045,431 A | 4/2000 | Cheprasov et al. | |
| 6,274,222 B1 * | 8/2001 | Sasaki | G11B 5/3103 360/313 |
| 6,551,438 B1 * | 4/2003 | Tanemura | G11B 5/3103 156/155 |
| 6,609,948 B1 | 8/2003 | Fontana, Jr. et al. | |
| 7,393,262 B2 | 7/2008 | Biskeborn | |
| 7,551,406 B1 | 6/2009 | Thomas et al. | |
| 7,607,215 B2 | 10/2009 | Murakoshi | |
| 9,190,083 B2 | 11/2015 | O'Konski et al. | |
| 10,008,222 B2 | 6/2018 | Rudy et al. | |
| 10,490,212 B2 * | 11/2019 | Fujii | G11B 5/1272 |

(Continued)

*Primary Examiner* — William J Klimowicz
(74) *Attorney, Agent, or Firm* — Kagan Binder, PLLC (57) ABSTRACT

An assembly for lapping multiple row bars, the assembly including a carrier having at least one carrier bond pad, multiple row bars adjacent to each other in a stack, wherein a first row bar of the stack is positioned closer to the carrier than any of the other multiple row bars of the stack and comprises at least one row bar bond pad, an electrical connection between at least one of the carrier bond pads and at least one of the row bar bond pads of the first row bar, and at least one electrical trace extending through at least two of the multiple row bars and electrically connected to at least the first row bar and one additional row bar of the stack. An outermost row bar of the stack includes an outer surface and at least one electronic lapping guide.

8 Claims, 6 Drawing Sheets

(56) References Cited

U.S. PATENT DOCUMENTS

| | | | |
|---|---|---|---|
| 11,037,585 B2* | 6/2021 | Wessel | G11B 5/3169 |
| 2004/0075940 A1* | 4/2004 | Bajorek | G11B 5/3173 |
| | | | 360/110 |
| 2006/0044683 A1* | 3/2006 | Matono | G11B 5/3166 |
| | | | 360/125.33 |
| 2007/0044297 A1* | 3/2007 | Matono | G11B 5/3166 |
| | | | 29/603.07 |
| 2015/0017883 A1 | 1/2015 | Ronshaugen et al. | |
| 2019/0381628 A1* | 12/2019 | Habermas | G11B 5/3163 |

* cited by examiner

ARTICLES FOR LAPPING STACKED ROW BARS HAVING IN-WAFER ELG CIRCUITS

CROSS-REFERENCE TO RELATED APPLICATIONS

This application is a divisional application of U.S. patent application Ser. No. 15/635,414, filed Jun. 28, 2017, the entire contents of which are incorporated herein by reference in its entirety.

BACKGROUND

Hard disk drives are common information storage devices having one or more rotatable disks that are accessed by magnetic reading and writing elements. These data transferring elements, commonly known as transducers or heads, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the rotating disk data tracks. Thus, each ABS must be precisely manufactured and processed to optimize its performance in a disk drive.

In one typical operation, a stack or chunk of multiple row bars or slider bars are manufactured using wafer processing techniques, after which lapping processes can be used to remove material at the ABS until a desired stripe height is achieved. In more particularity, a stack or chunk of row bars is processed by cutting a single bar from the stack of bars, then attaching the bar to a lapping carrier. The ABS of this mounted bar is then precisely lapped, as the ABS is a critical surface that must be polished or lapped with high accuracy in order to provide the desired performance of the drive. At any point after the first row bar is cut from the stack of bars, a subsequent row bar can be cut from the stack so that its corresponding ABS can be lapped. This process continues until the last row bar of the chunk or stack is processed.

Each row bar includes multiple adjacent sliders across its width. These sliders each include at least one electronic lapping guide (ELG) in a particularly designed location relative to the lapping surface or ABS, along with one or more corresponding ELG bond pads. The ELG can be a thin film resistor that is provided as an analog device, for example. With such an ELG, the electrical resistance is measured during processing and will increase with material removal during the lapping process. In order to monitor the ELG resistance during this process, wires are bonded to bond pads on the lapping carrier and to each row bar.

In order to monitor the ELG resistance during another exemplary lapping process, wires are bonded at one end to bond pads on a lapping carrier to which a stack of row bars are attached. The other end of each of the wires is attached to one of the multiple bond pads on the outermost row bar. When lapping the ABS, the electrical resistances of the ELGs are monitored until a resistance that corresponds to a desired stripe height of the ABS is reached. In particular, the ELG resistance can be measured, monitored, and compared to predetermined or calculated ELG resistance values to determine when a particular ELG height is reached or achieved. At this point, the lapping process can stop.

Figure 1A:
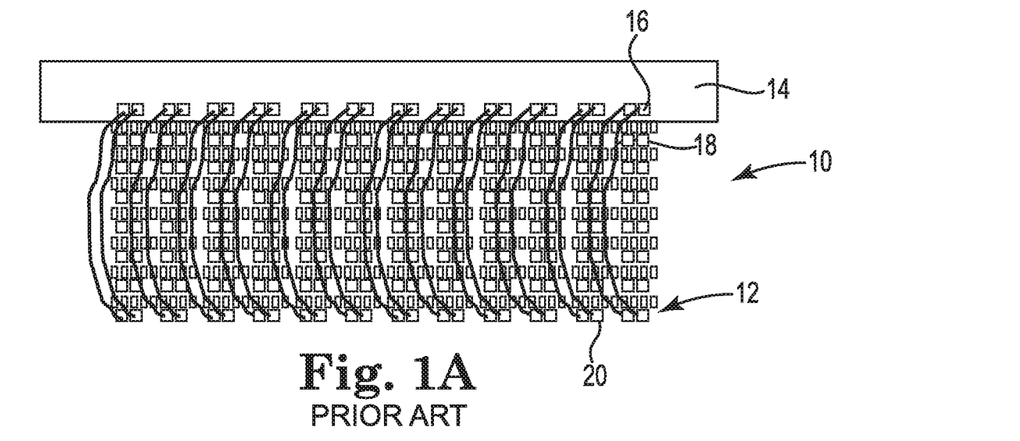
FIGS. 1A-1C are top views of three prior art steps for processing a row bars of a stack.
Figure 1B:
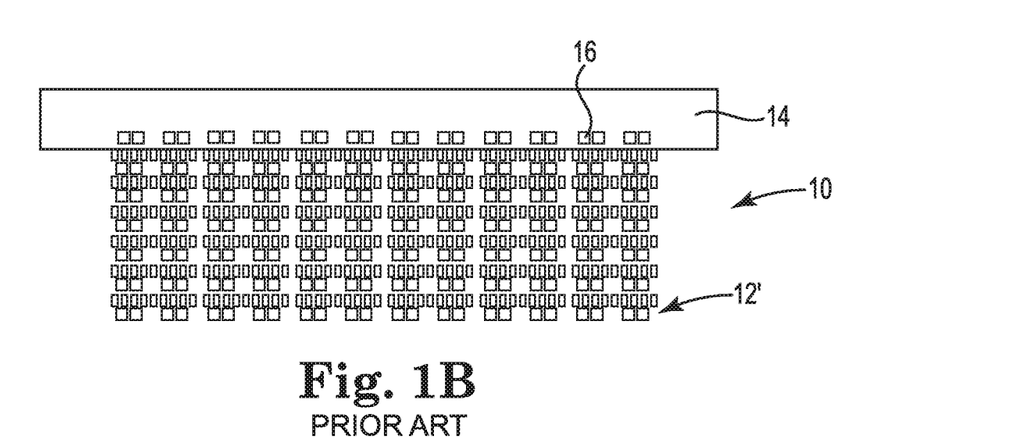
Figure 1C:
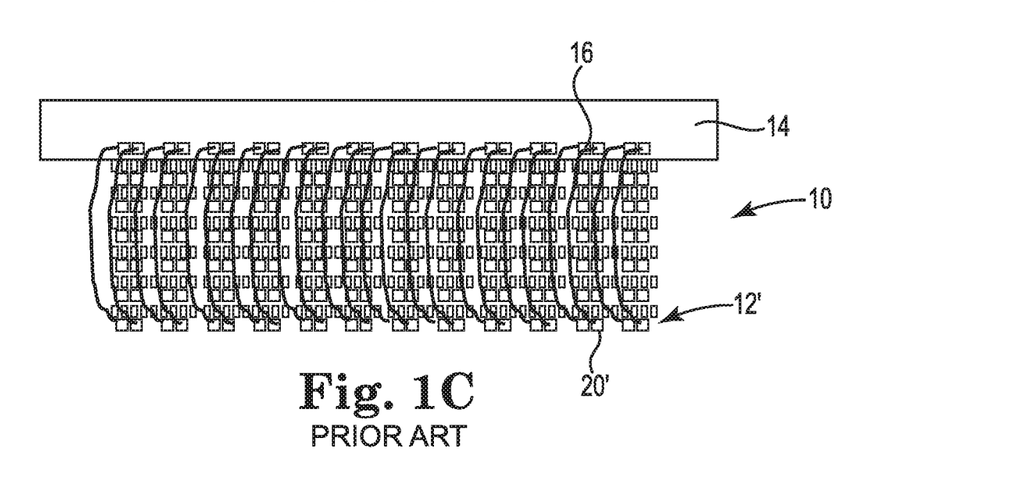

An exemplary prior art process is illustrated in FIGS. 1A-1C, which is a schematic view of three steps in processing a stack of row bars. In particular, FIG. 1A illustrates a stack 10 including multiple row bars or slider bars 12. In this embodiment, seven of such row bars 12 are shown. The stack 10 is mounted to a lapping carrier 14 that includes multiple bond pads 16 across its width. Each of multiple wires 18 are bonded at a first end to one of these bond pads 16 and bonded at a second end to one of the ELG pads 20 on the row bar 12 that is furthest from the lapping carrier 14 (i.e., the "bottom" row bar 12 in the illustration). The lapping operation can then be performed on the ABS of the row bar 12 while monitoring the electrical resistance until a desired resistance is achieved.

The wires 18 are then removed and the lowest or last row bar 12 is sliced from the stack 10, thereby exposing the ABS of the next lowest row bar 12', as illustrated in FIG. 1B. Wires 18 are then reattached at one end to the bond pads 16 of the lapping carrier 14 and attached at the opposite wire end to one of the ELG pads 20' of the row bar 12'. Again, the lapping operation can be performed on the ABS of the row bar 12' while monitoring the electrical resistance until a desired resistance is achieved and the row bar 12' is sliced from the stack 10. This process of removing and replacing wires is repeated until all of the row bars are lapped and sliced from the stack 10, which process is time consuming and requires multiple steps of attaching and removing a large number of wires. Thus, a need exists for a method of processing row bars while measuring ELG resistance that requires less processing steps and therefore is more efficient.

SUMMARY

In general, methods and assemblies of the invention relate to processing multiple row bars that are provided in a stack or chunk with electrical traces that extend within the wafer and through all of the bars. In this way, each bar can be lapped and cut from the stack without having to electrically reconnect the wires between the lapping carrier and the bar.

Aspects of the invention described herein are directed to a method of lapping multiple row bars provided in a stack that includes at least one electrical trace extending through multiple row bars. The method includes the steps of first electrically connecting a first row bar of the multiple row bars to at least one bond pad of a carrier, wherein a first row bar of the stack is positioned closer to the carrier than any of the other row bars of the stack, and electrically connecting an outermost bar of the stack to the first row bar of the stack by at least one electrical trace, wherein the outermost bar of the stack comprises at least one electronic lapping guide. The method further includes lapping an outer surface of the outermost row bar until a signal provided by at least one electronic lapping guide of the outermost row bar reaches a predetermined value, and then terminating the lapping of the outer surface of the outermost row bar. The method further includes the step of removing the outermost row bar from the stack to expose a second row bar, wherein the second row bar is electrically connected to the first row bar of the stack with at least one electrical trace.

In other aspects of the invention, an assembly for lapping multiple row bars is provided that includes a carrier comprising at least one bond pad, multiple row bars adjacent to each other in a stack, and at least one electrical trace extending through at least two of the multiple row bars and electrically connected to at least one bond pad of the carrier. In this assembly, a first row bar of the stack comprises at least one electronic lapping guide and an electrical connection within the row bar stack is provided between at least one bond pad of the carrier and at least one electronic lapping guide of the first row bar by at least one electrical trace.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

The methods and systems described herein are applicable to typical hard disk drive systems, which include at least one magnetic storage disk configured to rotate about an axis, an actuation motor (e.g., a voice coil motor), an actuator arm, a suspension assembly that includes a load beam, and a slider carrying a transducing or read/write head. The slider is supported by the suspension assembly, which in turn is supported by actuator arm. Together, the actuator arm, the suspension assembly and slider form a head stack assembly. The actuation motor is configured to pivot the actuator arm about an axis in order to sweep suspension and slider in an arc across a surface of the rotating disk with the slider "sliding" or "flying" across the disk on a cushion of air, often referred to as an air bearing. The read/write head carried by the slider can be positioned relative to selected concentric data tracks of the disk by a piezoelectric microactuator, for example. A stack of co-rotating disks can be provided with additional actuator arms, suspension assemblies, and sliders that carry read/write heads for reading and writing at top and bottom surfaces of each disk in the stack.

The read/write heads described above are carried by a slider that is used to read from and write to a data track on a disk. The slider is carried by an arm assembly that includes an actuator arm and a suspension assembly, which can include a separate gimbal structure or can integrally form a gimbal. In a typical process, an array of sliders is formed on a common substrate or a wafer which is then sliced to produce bars, with a row of sliders in a side-by-side pattern on each bar. The bars (which can be referred to as row bars) are then subjected to a series of processes to form individual sliders, including lapping, cleaning, formation of air-bearing surfaces (ABS), and dicing.

Figure 2:
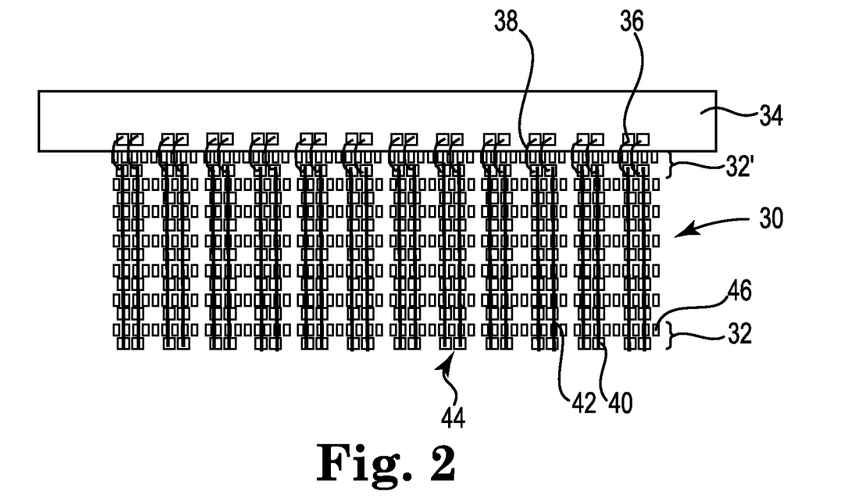
FIG. 2 is a top view of a stack of row bars mounted to a lapping carrier in accordance with an embodiment of the invention.
Figure 3:
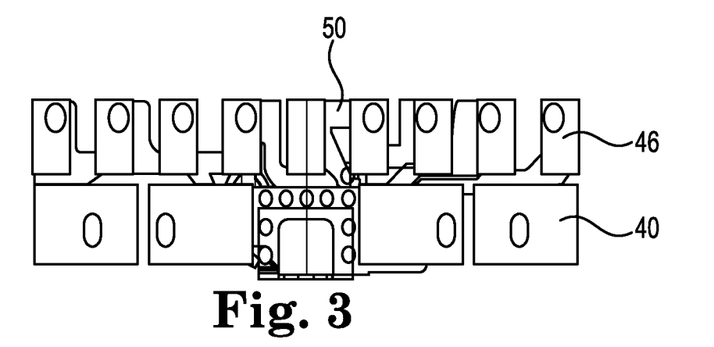
FIG. 3 is an enlarged top view of a portion of a row bar, including multiple bond pads and the interior metal traces.
Figure 4:
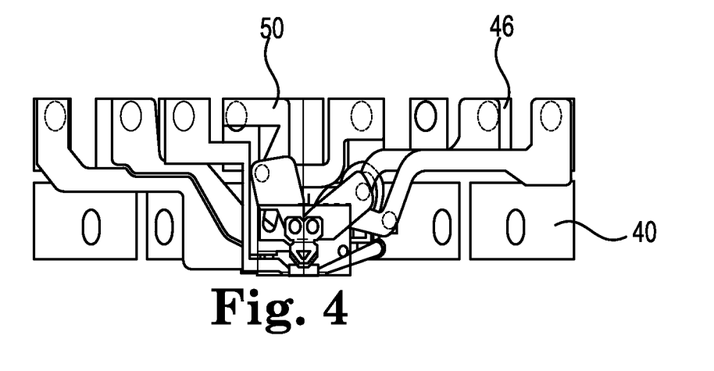
FIG. 4 is an enlarged bottom view of a portion of the row bar of FIG. 3, which illustrates metal traces relative to multiple bond pads.
Figure 5:
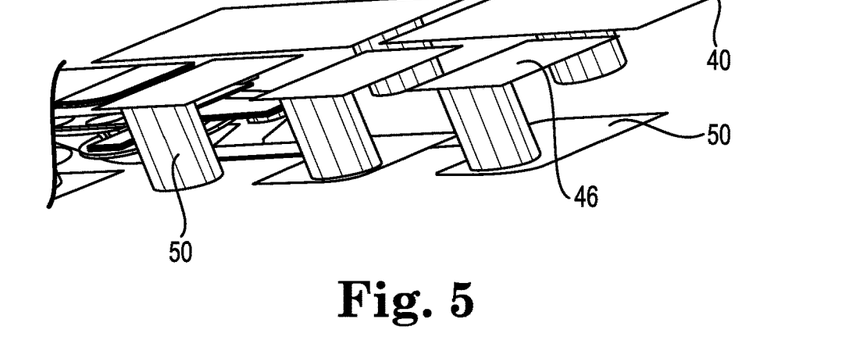
FIG. 5 is an enlarged isometric view of a portion of the row bar of FIG. 3, illustrating spaces between the bond pads and metal traces.
Figure 6:
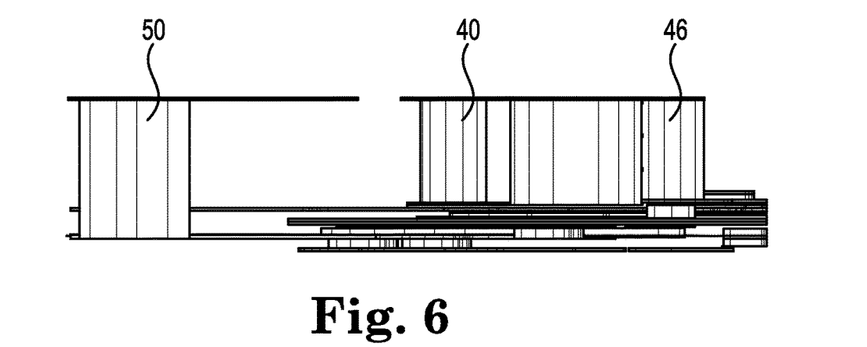
FIG. 6 is an enlarged side view of a portion of the row bar of FIG. 3.

Referring now to the Figures, wherein the components are labeled with like numerals throughout the several Figures, and initially to FIG. 2, a chunk or stack 30 is illustrated that includes multiple row bars or slider bars 32. This stack 30 would typically be one of several stacks divided from a relatively large wafer. In this embodiment, seven of such row bars 32 are shown as part of the stack 30, although it is understood that any number of row bars can be provided in each stack. Each row bar 32 includes a series of first electrical contacts or bond pads 46 that are illustrated in a row at the upper part of each row bar 32 (and what will eventually be the trailing edge of each slider, once the processing is completed). An adjacent row of a second series of electrical contacts or bond pads 40 is also shown, which second row of bond pads 40 can be relatively larger than those of the bond pads 46 of the first row, although the these pads can instead be the same size or smaller than the bond pads 46 of the first row. This illustrates one of any number of orientations of bond pads 40 and 46 to one another. According to the illustrated embodiment, the relatively smaller and more numerous bond pads 46 are provided for electrical connection to various transducer devices and other devices of a developed slider design, such as including contacts for read and write transducers, read and write heaters, bolometers, and/or laser elements as may be provided for operation of a head slider design known as HAMR design, for example.

The bond pads 46 are conventionally electrically connected with wires or conductor elements that are typically provided to extend along the supporting head suspension assembly for controlled operation of each of the functional elements of a head slider. The bond pads 40 are provided for utilization during the fabrication process of a head slider from the chunk or stack 30, as opposed to the operative use of bonding pads 46 for slider elements during operation of a disk drive. In particular, the bond pads 40 are provided to allow for temporary positive and negative electrical connection of electrical lapping guides (ELGs) during slider fabrication processes. As such, a pair of the bond pads 40 can be used as ELG pads for ELG monitoring during slider processing. Multiple pairs of bond pads 40 and ELGs can therefore be utilized during fabrication.

The stack 30 is mounted to a lapping carrier 34 that includes multiple carrier bond pads 36 across its width. Each of multiple wires 38 are bonded at a first end to one of these carrier bond pads 36 and bonded at a second end to one of multiple ELG pads 40 on the row bar 32' that is closest to the lapping carrier 34 (i.e., the "top" row bar in the illustration). Note that the term "wires" as used herein can include metal wires soldered to bond pads and/or any other type of conductive adhesive and/or other conductive trace materials.

The stack 30 further includes connecting electrical traces 42 within the internal structure of the multiple row bars 32.

Each of the connecting traces 42 extends between at least two adjacent row bars 32, although the connecting traces 42 can extend through all of the row bars 32 of a particular stack 30 (as shown). In this embodiment, the lapping operation can then be performed on an air bearing surface (ABS) 44 of the row bar 32 that is furthest from the lapping carrier 34 while monitoring the electrical resistance until a desired resistance is achieved. The outer surface of that last or lowest row bar 32 can then be sliced from the stack 30, after which the ABS of the next row bar in the stack (which would now be the "lowest" row bar in the stack, in this embodiment) can be lapped while monitoring the electrical resistance of the next row bar 32 until a desired resistance is again achieved.

The desired or target resistance will generally be the same for each of the row bars 32 of a stack 30, although it is contemplated that the desired or target resistances may be different for adjacent row bars from the same stack. This wire attachment to only one row bar of the stack and the use of electrical traces through multiple row bars eliminates the prior art steps of attaching, removing, and reattaching wires when each row bar is sliced from a stack, since the only wires or conductive traces provided in this embodiment of the invention are those that remain attached to the set of bond pads closest to the lapping carrier throughout the lapping of multiple row bars. The process of lapping an ABS and slicing off subsequent row bars is repeated until all of the row bars 32 are lapped and sliced from the stack 30.

FIGS. 3 through 6 are enlarged top, bottom, isometric, and side views, respectively of a portion of a row bar 32, including ELG bond pads 40, bond pads 46, and interior connecting structure 50. As is illustrated most clearly in the isometric view of FIG. 5, a number of gaps or channels are provided between the bond pads and connecting structure, which are spaces in which the electrical traces can be positioned for electrically connecting at least two adjacent row bars to each other. The gaps or channels can be provided in any configuration that allows for continuous electrical traces between a desired number of row bars although gaps or channels that have less angles and bends will require less electrical trace material than those with more angles and bends. The gaps or channels can also be provided so that they are on the same or different planes, where various bends and angles can be on the same or different planes through each row bar. Each row bar of a stack can have identical gaps or channels to accommodate the electrical traces, or it is contemplated that row bars within a stack instead have different gaps or channels from each other. The electrical traces can also have different thicknesses to provide for desired performance characteristics.

Figure 7:
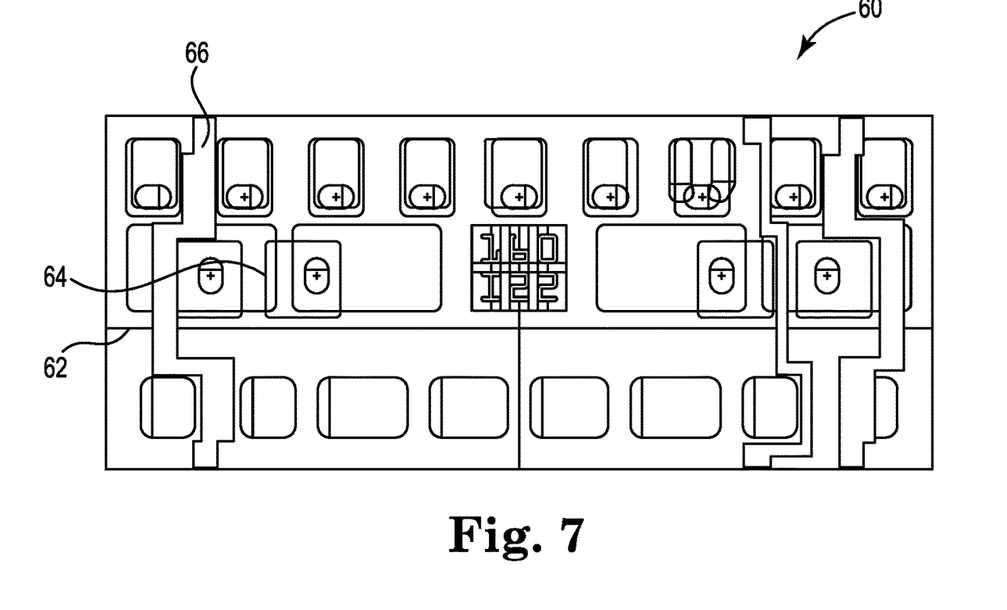
FIG. 7 is an enlarged top sectional view of a portion of a row bar of the invention, including an in-wafer ELG circuit.
Figure 8:
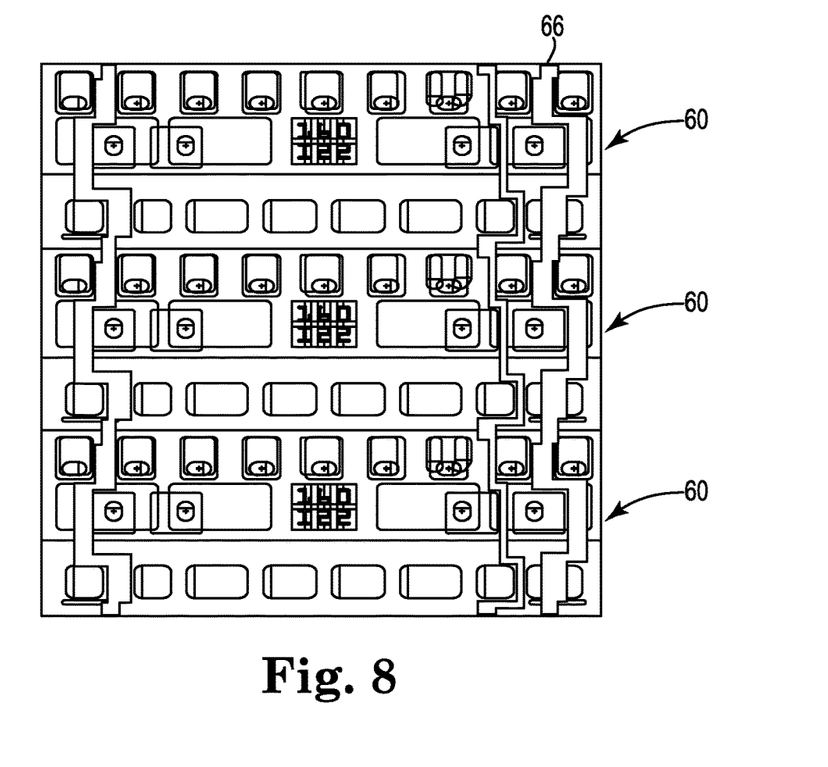
FIG. 8 is an enlarged top sectional view of a portion of three adjacent row bars of the type illustrated in FIG. 7, wherein the row bars are electrically connected to each other in accordance with the invention.

FIG. 7 is an enlarged top sectional view of a portion of a row bar 60 of the invention, which generally includes an air bearing surface (ABS) 62 and multiple electrical lapping guides 64. This figure illustrates masks for the leads and studs below the bottom clad of the row bar 60. In accordance with the invention, electrical traces 66 are shown as extending through the row bar 60. The electrical traces 66 can be provided on the same plane or can be on more than one plane, wherein the path that is chosen for the electrical traces 66 can be designed or selected to avoid interference with the locations of the other components of the row bar 60. FIG. 8 is an enlarged top sectional view of a portion of three adjacent row bars 60 of the type illustrated in FIG. 7, wherein the row bars are electrically connected to each other with electrical traces 66, in accordance with the invention.

Figure 9:
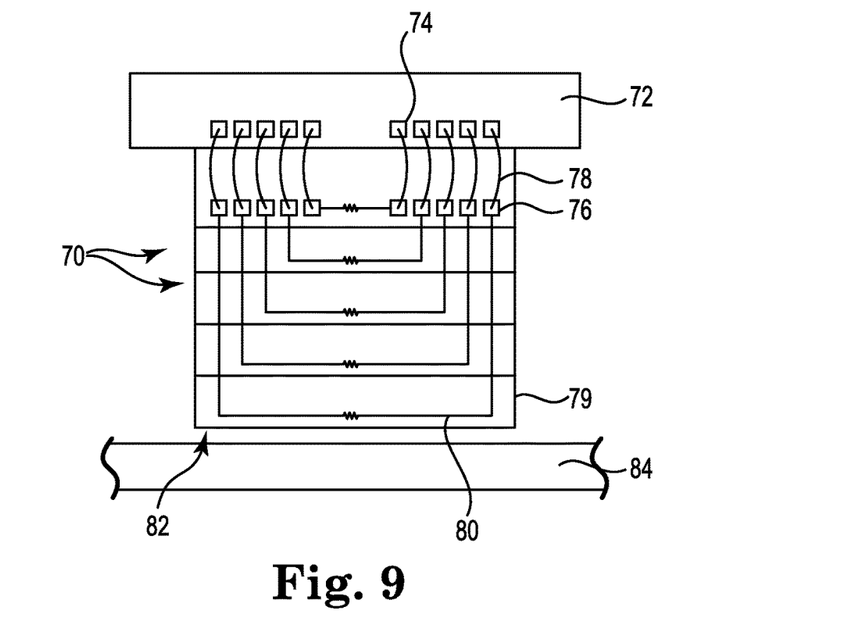
FIG. 9 is a schematic illustration of one embodiment of electrical connections of ELG bond pads to carrier bond pads, in accordance with the invention.

FIG. 9 is a schematic illustration of one embodiment of electrical connections of ELG bond pads to carrier bond pads, in accordance with the invention, and including an electrical circuit provided within the wafer or stack of row bars. In particular, a stack of multiple row bars 70 is illustrated, wherein five of such row bars 70 are shown as part of the stack, although it is understood that more or less than five row bars can be provided. The stack is mounted to a lapping carrier 72, which includes multiple carrier bond pads 74 across its width. The row bar 70 closest to the lapping carrier 72 includes an exemplary configuration of a row of electrical contacts or bond pads 76. Each of multiple wires 78 are bonded at a first end to one of the carrier bond pads 74 and bonded at a second end to one of the multiple bond pads 76 on the row bar 70 that is closest to the lapping carrier 72 (i.e., the "top" row bar 70 in the illustration).

In this embodiment, each row bar 70 includes an ELG (shown as a resistor 80), which is connected to two bond pads 76 that are connected to the carrier 72. The circuit leads for ELGs of each lapped bar are contained in the stack and travel through each bar and the bar 70 that is bonded to the carrier 72. With this configuration, current only flows through the row bar 70 that is being lapped.

In an exemplary first operation, a lapping operation is performed with a lapping plate 84 on an air bearing surface (ABS) 82 of a row bar 79 that is furthest from the lapping carrier 72 while monitoring the electrical resistance of the ELG of that row bar 79 until a desired resistance is achieved. This monitoring of the ELG of the lapped bar is from the bond pads on the carrier 72, which are electrically connected to the lapped bar 79 by the bonding wires 78 and the internal stack circuit connected to the bar 79. The last or lowest row bar 79 can then be sliced from the stack, leaving the remaining row bars in the stack (e.g., four remaining row bars, in the illustrated embodiment) mounted to the lapping carrier 72. The ABS or outer surface of the next row bar 70 in the stack (which would now be the "lowest" row bar in the illustrated stack) can then be lapped while monitoring the electrical resistance of the next row bar 70 until a desired resistance of the ELG resistor 80 of that row bar 70 is again achieved. The desired or target resistance will generally be the same for each of the row bars 70 of a stack, although it is contemplated that the desired or target resistances of the ELG resistors may be different for adjacent row bars 70 from the same stack.

Figure 10:
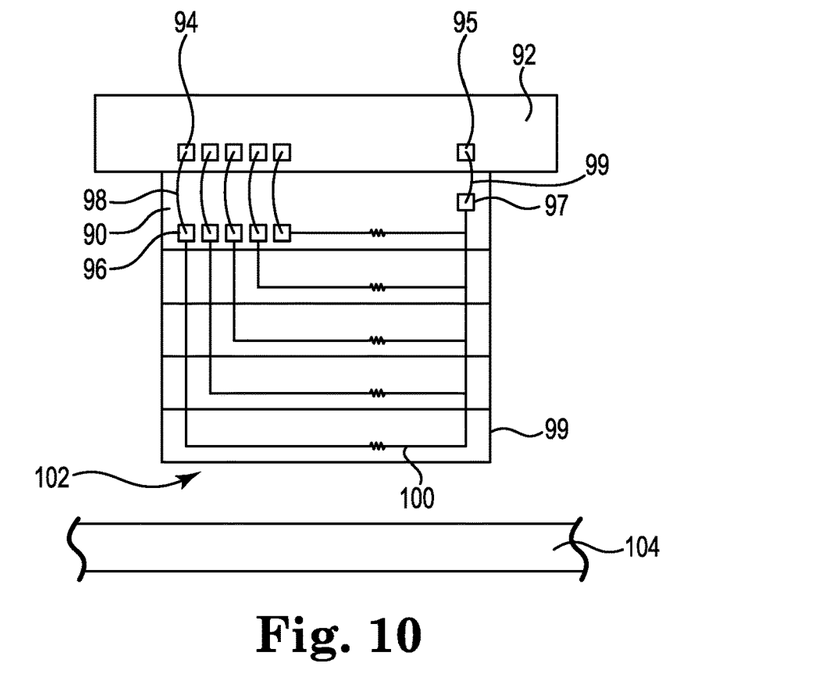
FIG. 10 is a schematic illustration of another embodiment of electrical connections of ELG bond pads to carrier bond pads, in accordance with the invention.

FIG. 10 is a schematic illustration of another embodiment of electrical connections of ELG bond pads to carrier bond pads, in accordance with the invention, and including the electrical circuit provided within the wafer or stack of row bars. In particular, a stack of multiple row bars 90 is illustrated, wherein five of such row bars 90 are shown as part of the stack. The stack is mounted to a lapping carrier 92, which includes a first set of carrier bond pads 94 and a common carrier bond pad 95 that is spaced from the carrier bond pads 94. The carrier bond pads 94 and the common carrier bond pad 95 have opposite polarities and are electrically connected such that each bond pad 94 is electrically connected to the common carrier bond pad 95. The illustrated embodiment includes five carrier bond pads 94 that are all electrically connected to the common carrier bond pad 95, although additional intervening electrical connections are included in each circuit, as will be described below.

The row bar closest to the lapping carrier 92 includes an exemplary configuration of a first set of electrical contacts or bond pads 96 and a common bond pad 97 that is spaced from the bond pads 96. Multiple wires 98 are bonded at a first end to one of these carrier bond pads 94 and bonded at a second end to one of the multiple bond pads 96 on the row bar that is closest to the lapping carrier 92 (i.e., the "top" row bar 90 in the illustration). In addition, a common wire 99 is bonded at a first end to the common bond pad 95 of the lapping carrier 92 and at a second end to the common bond pad 97 of the row bar 90 that is closest to the lapping carrier 92. With this embodiment, while one end of each circuit still uses individual bond pads 94 and 96 for each circuit, the other end of each circuit uses common bond pads 95 and 97, thereby using less bond pads for the stack than the embodiment of FIG. 9, for example, to complete the electrical circuits for each of the row bars 90.

In this embodiment, each row bar 90 includes an ELG (shown as a resistor 100) which is electrically connected between each bond pad 96 of the row bar 90 and the common bond pad 97, wherein each row bar 90 includes one ELG. As with the embodiment of FIG. 9, the configuration of FIG. 10 provides for current flowing only through the row bar 90 that is being lapped. In an exemplary processing step, a lapping operation is performed with a lapping plate 104 on an air bearing surface (ABS) 102 of the row bar 90 that is furthest from the lapping carrier 92 while monitoring the electrical resistance of the last or lowest row bar 90 until a desired resistance is achieved. The last or lowest row bar 90 can then be sliced from the stack, leaving the remaining row bars 90 in the stack that is mounted to the lapping carrier 92. The ABS of the next row bar 90 in the stack (which would now be the "lowest" row bar in the stack, in this embodiment) can then be lapped while monitoring the electrical resistance of that row bar 90 until a desired resistance of the ELG resistor of that row bar 90 is again achieved. The desired or target resistance will generally be the same for each of the row bars 90 of a stack, although it is contemplated that the desired or target resistances of the resistors 100 may be different for adjacent row bars 90 from the same stack.

Figure 11:
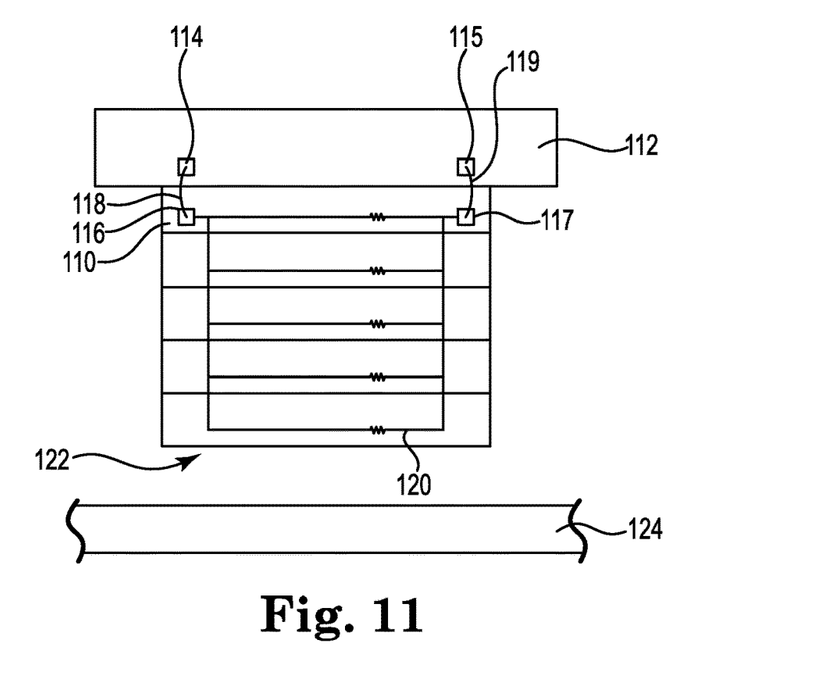
FIG. 11 is a schematic illustration of another embodiment of electrical connections of ELG bond pads to carrier bond pads, in accordance with the invention.

FIG. 11 is a schematic illustration of another embodiment of electrical connections of ELG bond pads to carrier bond pads, in accordance with the invention, and including the electrical circuit provided within the wafer or stack of row bars. In particular, a stack of multiple row bars 110 is illustrated. The stack is mounted to a lapping carrier 112, which includes a first carrier bond pad 114 and a second carrier bond pad 115 that is spaced from the first carrier bond pad 114. The carrier bond pads 114, 115 have opposite polarities and are electrically connected to each other, although additional intervening electrical connections are included in each circuit, as will be described below.

The row bar 110 closest to the lapping carrier 112 includes an exemplary configuration of an ELG bond pad 116 and an ELG bond pad 117 spaced from each other. A wire 118 is bonded at a first end to bond pad 114 and bonded at a second end to ELG bond pad 116 on the row bar 110 that is closest to the lapping carrier 112 (i.e., the "top" row bar 110 in the illustration). In addition, a wire 119 is bonded at a first end to the bond pad 115 of the lapping carrier 112 and at a second end to the ELG bond pad 117 of the row bar 110 that is closest to the lapping carrier 112. With this embodiment, both ends of each circuit use common bond pads 114, 115, 116, and 117, thereby using less bond pads for the stack to complete the electrical circuits for each of the row bars 110 than the embodiments of FIGS. 9 and 10, for example.

In this embodiment, each row bar includes an ELG (shown as a resistor 120), which is electrically connected between ELG bond pad 116 of the row bar 110 and ELG bond pad 117, wherein each row bar 110 includes one ELG. As with the embodiments of FIGS. 9 and 10, the configuration of FIG. 11 provides for current flowing only through the row bar 110 that is being lapped. In an exemplary processing step, a lapping operation is performed with a lapping plate 124 on an air bearing surface (ABS) 122 of the row bar 110 that is furthest from the lapping carrier 112 while monitoring the electrical resistance of the last or lowest row bar 110 until a desired resistance is achieved. The last or lowest row bar 110 can then be sliced from the stack, leaving the remaining row bars in the stack mounted to the lapping carrier 112.

In the embodiment of FIG. 11, the circuit only uses two ELG bond pads 116, 117 and all of the lapping resistors 120 are wired in parallel. However, as the first row bar 110 is being lapped and the resistance changes (e.g., from ~30Ω to ~5000Ω) through a lapping operation, the circuit resistance ($R_c$) varies minimally. In an embodiment of the invention, the circuit voltage change due to lapping away a resistive lapping guide can be improved by making the resistors different values so that most the current is flowing through the ELG of the row bar being lapped. In the illustrated exemplary embodiment, the resistance of the ELG resistors 120 can be designated as $R_1$ (furthest from the lapping carrier 112) through $R_5$ (closest to the lapping carrier 112), such that $R_1 \ll R_2 \ll R_3 \ll R_4 \ll R_5$, and the circuit resistance $R_c$, is represented by the following formula:

$$\Delta R_c = \frac{1}{\frac{1}{\Delta R_1} + \frac{1}{R_2} + \frac{1}{R_3} + \frac{1}{R_4} + \frac{1}{R_5}}$$

Figure 12:
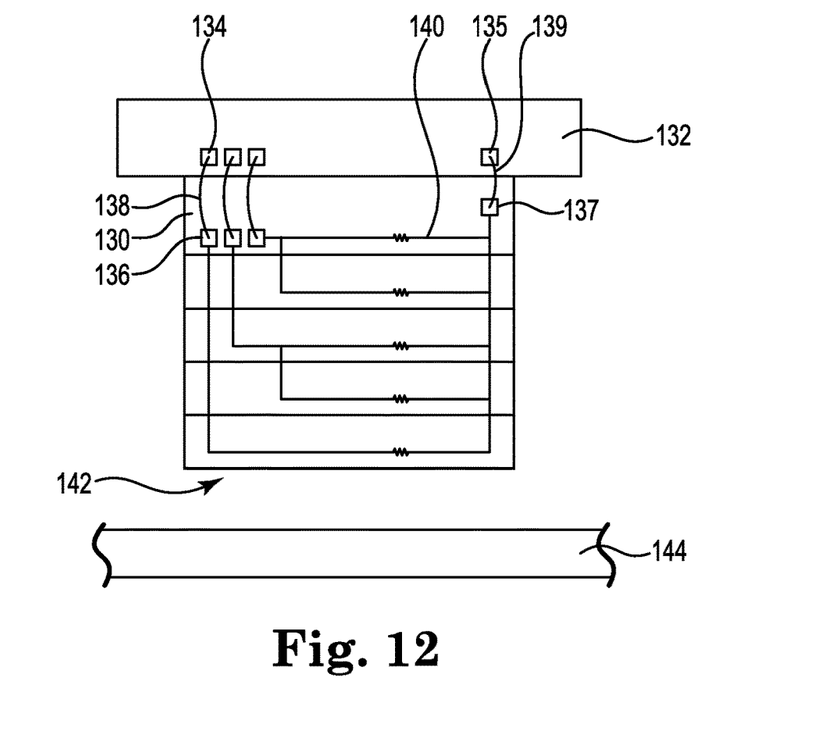
FIG. 12 is a schematic illustration of another embodiment of electrical connections of ELG bond pads to carrier bond pads, in accordance with the invention.

FIG. 12 is a schematic illustration of another embodiment of electrical connections of ELG bond pads to carrier bond pads, in accordance with the invention that is generally a combination of the circuits discussed above relative to FIGS. 10 and 11. In this embodiment, a stack of multiple row bars 130 is illustrated. The stack is mounted to a lapping carrier 132, which includes a first set of carrier bond pads 134 and a common carrier bond pad 135 that is spaced from the carrier bond pads 134. The carrier bond pads 134 and the common carrier bond pad 135 have opposite polarities and are electrically connected such that each bond pad 134 is electrically connected to the common carrier bond pad 135. The illustrated embodiment includes five carrier bond pads 134 that are all electrically connected to the common carrier bond pad 135, although additional intervening electrical connections are included in each circuit, as will be described below.

The row bar 130 closest to the lapping carrier 132 includes an exemplary configuration of a first set of electrical contacts or bond pads 136 and a common bond pad 137 that is spaced from the bond pads 136. Multiple wires 138 are bonded at a first end to one of these carrier bond pads 134 and bonded at a second end to one of the multiple bond pads 136 on the row bar 130 that is closest to the lapping carrier 132 (i.e., the "top" row bar 130 in the illustration). In addition, a common wire 139 is bonded at a first end to the common bond pad 135 of the lapping carrier 132 and at a second end to the common bond pad 137 of the row bar 130 that is closest to the lapping carrier 132. With this embodiment, while one end of each circuit uses individual bond pads 134 and 136 for each circuit, the other end of each circuit uses common bond pads 135 and 137.

In this embodiment, an ELG resistor 140 is electrically connected between each bond pad 136 of the row bar 140 and the common bond pad 137, wherein each row bar 130 includes one of the resistors 140, as illustrated. The embodiment of FIG. 12 provides less parasitic resistance than the embodiment of FIG. 11 and less carrier bond pads than the embodiment of FIG. 10.

During processing, a lapping operation is performed with a lapping plate 144 on an air bearing surface (ABS) 142 of the row bar 130 that is furthest from the lapping carrier 132 while monitoring the electrical resistance of the resistor 140 of that row bar 130 until a desired resistance is achieved. The last or lowest row bar 130 can then be sliced from the stack, leaving the remaining row bars 130 in the stack that is mounted to the lapping carrier 132. The ABS of the next row bar 130 in the stack (which would now be the "lowest" row bar in the stack, in this embodiment) can then be lapped while monitoring the electrical resistance of that row bar 130 until a desired resistance of the resistor 140 of that row bar 130 is again achieved. As shown, the top two resistors 140 are wired into the same circuit, with the resistor 140 that is closest to the carrier 132 having a higher resistance than the second resistor 140 so that most the current is flowing through the ELG of the row bar being lapped. Likewise, the top third and fourth resistors 140 are wired into the same circuit, with the third resistor 140 having a higher resistance than the fourth resistor 140 so that most the current is flowing through the ELG of the row bar being lapped.

Figure 13:
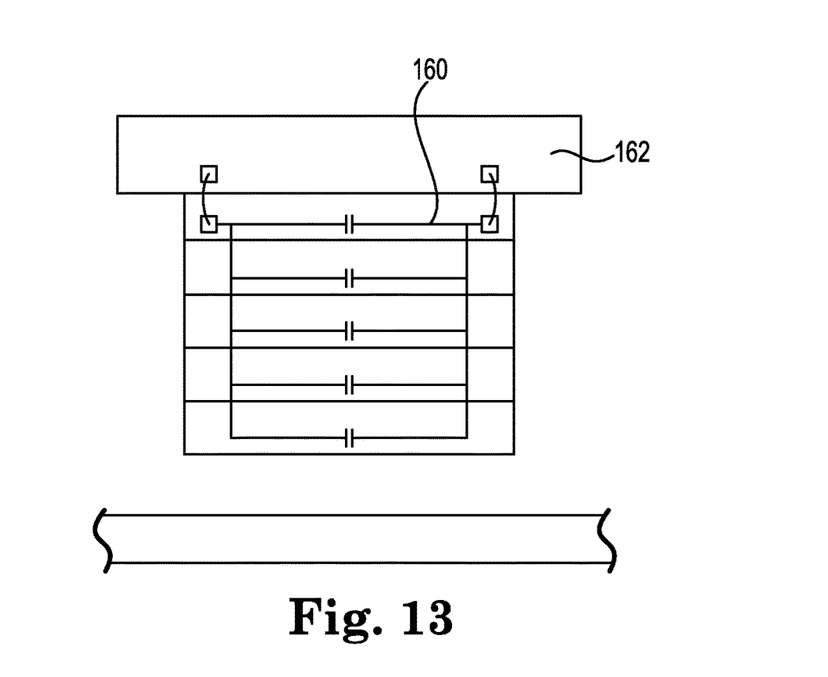
FIG. 13 is a schematic illustration of another embodiment of electrical connections of ELG bond pads to carrier bond pads, in accordance with the invention.

FIG. 13 is a schematic illustration of another embodiment of electrical connections of ELG bond pads to carrier bond pads, in accordance with the invention. In this embodiment, instead of using resistors as lapping guides, capacitors are used as capacitive resistance guides, where the parallel capacitance of the circuit is the sum of the capacitance of the individual ELGs, as in the following formula, with a capacitor 160 that is closest to a lapping carrier 162 being designated as $C_5$ and the capacitor 160 that is furthest from the lapping carrier 162 being designated as $C_1$:

$$\Delta C_c = \Delta C_1 + C_2 + C_3 + C_4 + C_5$$

Unlike the parallel resistor networks described above relative to FIGS. 9-12, this embodiment of FIG. 13 provides for a change in circuit capacitance that varies linearly with a change in the lapped bar capacitance. In addition, the individual ELG capacitance varies linearly with the lapping amount. Therefore, the bar stack parallel circuit capacitance varies linearly with bar lapping amount, similar to the single bar resistive lapping ELG circuit.

With regard to embodiments that include resistive elements, resistance change ($\Delta R_{lapping}$) of resistive ELG changes linearly with distance lapped into head ($\Delta h$), as represented by the following formula, where p is resistivity of ELG material, l is cross-track length of ELG, and d is the down track thickness of the ELG:

$$\Delta R_{lapping} \sim \frac{\rho l}{\Delta h d}$$

With regard to embodiments that include capacitive resistance guides, the capacitance change ($\Delta C_{lapping}$) of capacitance ELG changes linearly with distance lapped into head ($\Delta h$), as represented by the following formula, where $\varepsilon$ is the permittivity of gap material, l is cross-track length of ELG, and d is the distance between the plates:

$$\Delta C_{lapping} \sim \frac{\varepsilon \Delta h l}{d}$$

Thus, lapping a capacitive ELG changes the capacitance linearly and the desired lapping amount ($\Delta h$) can be controlled by monitoring the capacitance change in the circuit ($\Delta C$).

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. An assembly for lapping multiple row bars, the assembly comprising:
   a carrier comprising at least one carrier bond pad;
   multiple row bars adjacent to each other in a stack, wherein a first row bar of the stack is positioned closer to the carrier than any of the other multiple row bars of the stack and comprises at least one row bar bond pad;
   at least one electrical connector, wherein each electrical connector comprises a proximal end attached to one of the carrier bond pads and a distal end attached to one of the row bar bond pads of the first row bar; and
   at least one electrical trace extending through at least two of the multiple row bars and electrically connecting at least the first row bar and one additional row bar of the stack;
   wherein an outermost row bar of the stack comprises an outer surface and at least one electronic lapping guide.

2. The assembly of claim 1, wherein each of the multiple row bars of the stack comprises an electronic lapping guide.

3. The assembly of claim 1, wherein at least one of the electrical connectors comprises a wire.

4. The assembly of claim 1, wherein the at least one electrical trace extends through all of the multiple row bars of the stack.

5. The assembly of claim 1, wherein the outer surface of each of the multiple row bars is an air bearing surface.

6. The assembly of claim 1, wherein at least one of the electrical connectors comprises conductive adhesive.

7. The assembly of claim 1, wherein at least one of the electrical connectors comprises conductive trace materials.

8. The assembly of claim 1, wherein the at least one electrical trace comprises a first end extending from the first row bar.

* * * * *